US010393249B2

(12) United States Patent
Ling et al.

(10) Patent No.: US 10,393,249 B2
(45) Date of Patent: Aug. 27, 2019

(54) DIFFERENTIAL, POWER TRANSMISSION SYSTEM AND VEHICLE

(71) Applicant: BYD COMPANY LIMITED, Shenzhen, Guangdong (CN)

(72) Inventors: Heping Ling, Shenzhen (CN); Zhen Zhai, Shenzhen (CN); Feng Zheng, Shenzhen (CN); Youbin Xu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 2 days.

(21) Appl. No.: 15/925,926

(22) Filed: Mar. 20, 2018

(65) Prior Publication Data

US 2018/0209525 A1 Jul. 26, 2018

Related U.S. Application Data

(63) Continuation of application No. PCT/CN2016/098899, filed on Sep. 13, 2016.

(30) Foreign Application Priority Data

Sep. 25, 2015 (CN) .......................... 2015 1 0624400

(51) Int. Cl.
*F16H 48/11* (2012.01)
*F16H 48/10* (2012.01)

(52) U.S. Cl.
CPC ........ *F16H 48/11* (2013.01); *F16H 2048/104* (2013.01)

(58) Field of Classification Search
CPC ........................... F16H 48/11; F16H 2048/104
(Continued)

(56) References Cited

U.S. PATENT DOCUMENTS 1,869,528 A * 8/1932 Trbojevich ............. F16H 48/11 475/252
3,406,593 A 10/1968 Vesey
(Continued)

FOREIGN PATENT DOCUMENTS

CN 2060831 U 8/1990
CN 2420167 Y 2/2001
(Continued)

OTHER PUBLICATIONS

International Search Report and Written Opinion for Application No. PCT/CN2016/098899, dated Sep. 13, 2016, 12 pages.

*Primary Examiner* — Leslie A Nicholson, III

(57) ABSTRACT

A differential, a power transmission system, and a vehicle are provided. The differential includes: a first planetary carrier, a first gear ring, and a first planetary gear disposed on the first planetary carrier and meshed with the first gear ring; and a second planetary carrier, a second gear ring, and a second planetary gear disposed on the second planetary carrier and meshed with the second gear ring and the first planetary gear, in which the first gear ring and the second gear ring are configured as two power output ends of the differential, the first planetary carrier and the second planetary carrier are configured as power input ends of the differential, and a revolution radius of the first planetary gear is different from a revolution radius of the second planetary gear.

20 Claims, 8 Drawing Sheets

(58) Field of Classification Search
USPC .................................................. 475/219, 220
See application file for complete search history.

(56) References Cited

U.S. PATENT DOCUMENTS

| | | | | | |
|---|---|---|---|---|---|
| 3,738,192 | A | | 6/1973 | Belansky | |
| 4,882,949 | A | * | 11/1989 | Inoue | F16H 48/10 475/249 |
| 5,078,661 | A | * | 1/1992 | Esaki | F16H 48/10 475/249 |
| 5,415,595 | A | * | 5/1995 | Nelson | F16H 35/008 475/221 |
| 5,897,453 | A | | 4/1999 | Mimura | |
| 8,113,088 | B2 | * | 2/2012 | Bawks | F16H 48/11 475/249 |
| 10,100,910 | B2 | * | 10/2018 | Nakayama | F16H 48/10 |
| 10,167,938 | B2 | * | 1/2019 | Ince | F16H 48/11 |
| 2010/0056313 | A1 | | 3/2010 | Lee | |
| 2015/0267798 | A1 | | 9/2015 | Biermann et al. | |

FOREIGN PATENT DOCUMENTS

| | | | |
|---|---|---|---|
| CN | 101598209 | A | 12/2009 |
| CN | 103511583 | A | 1/2014 |
| CN | 103573961 | A | 2/2014 |
| CN | 103671810 | A | 3/2014 |
| CN | 103775601 | A | 5/2014 |
| CN | 104276026 | A | 1/2015 |
| DE | 102012207495 | A1 | 11/2013 |
| DE | 102012207498 | A | 11/2013 |
| DE | 102012216402 | A | 3/2014 |
| DE | 102012216404 | A1 | 3/2014 |
| DE | 102012216413 | A1 | 3/2014 |
| DE | 102012219212 | A1 | 4/2014 |
| DE | 102014102252 | A1 | 8/2015 |
| JP | H09280340 | A | 10/1997 |
| JP | 2015068493 | A | 4/2015 |
| JP | 2015075139 | A | 4/2015 |
| WO | 2013167316 | A | 11/2013 |

* cited by examiner

DIFFERENTIAL, POWER TRANSMISSION SYSTEM AND VEHICLE

CROSS-REFERENCE TO RELATED APPLICATIONS

This application is a continuation application of International Application No. PCT/CN2016/098899, filed on Sep. 13, 2016, which is based on and claims priority to and benefits of Chinese Patent Application No. 201510624400.4, filed with the State Intellectual Property Office (SIPO) of P. R. China on Sep. 25, 2015. The entire contents of the above-identified applications are incorporated herein by reference.

FIELD

Embodiments of the present disclosure relate to a differential, a power transmission system having the differential, and a vehicle having the power transmission system.

BACKGROUND

In a differential technology, a differential includes a driven gear of a final drive, a planetary gear, a center gear, and the like. The planetary gear is mounted on a secondary plate of the driven gear through a square shaft and a shaft sleeve and is meshed with the center gear, so as to implement revolution and moving functions thereof by a revolution pair and a planar moving pair. The center gear is connected to two half shafts, namely left and right half shafts, through an angular alignment pin and a cylindrical pair or through a spline to achieve an objective of outputting torque. Original components, such as left and right housings and a planetary gear shaft of the differential, are omitted from the differential, and instead, the planetary gear is directly mounted on the secondary plate of the driven gear of the final drive by using the square shaft and the shaft sleeve, thereby effectively reducing a number of parts of the differential, simplifying the structure thereof, and reducing the weight thereof.

However, such a differential implements an inter-wheel speed differential by using a symmetrical angle gear structure, which is only a partial innovation for a conventional symmetrical angle gear differential and cannot really overcome disadvantages thereof. For example, an axial dimension of such a differential structure is excessively large, masses of the housing and the angle gear therein are big, and reliability thereof is relatively poor.

SUMMARY

Embodiments of the present disclosure aims at solving the foregoing technical problems in the prior art.

Embodiments of the present disclosure provide a differential, which implements a speed differential function by using a planetary differential principle, has a compact and simple structure, and can at least reduce an axial dimension thereof.

Embodiments of the present disclosure further provide a power transmission system having the differential according to above embodiments of the present dislcosure.

Embodiments of the present disclosure further provide a vehicle having the power transmission system according to above embodiments of the present dislcosure.

A differential according to embodiments of the present disclosure includes: a first planetary carrier; a first gear ring; a first planetary gear disposed on the first planetary carrier, and meshed with the first gear ring; a second planetary carrier; a second gear ring; and a second planetary gear disposed on the second planetary carrier, and meshed with the second gear ring as well as the first planetary gear, in which the first gear ring and the second gear ring are configured as two power output ends of the differential, the first planetary carrier and the second planetary carrier are configured as power input ends of the differential, and a revolution radius of the first planetary gear is different from a revolution radius of the second planetary gear.

The differential according to embodiments of the present disclosure implements a speed differential function by using a planetary differential principle, has a high space utilization ratio in terms of structure and connection form, provides a small axial dimension, and also has plenty of advantages in production and assembly.

A power transmission system according to embodiments of the present disclosure includes the differential according to the foregoing embodiments of the present disclosure.

A vehicle according to embodiments of the present disclosure includes the power transmission system according to the foregoing embodiment o the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
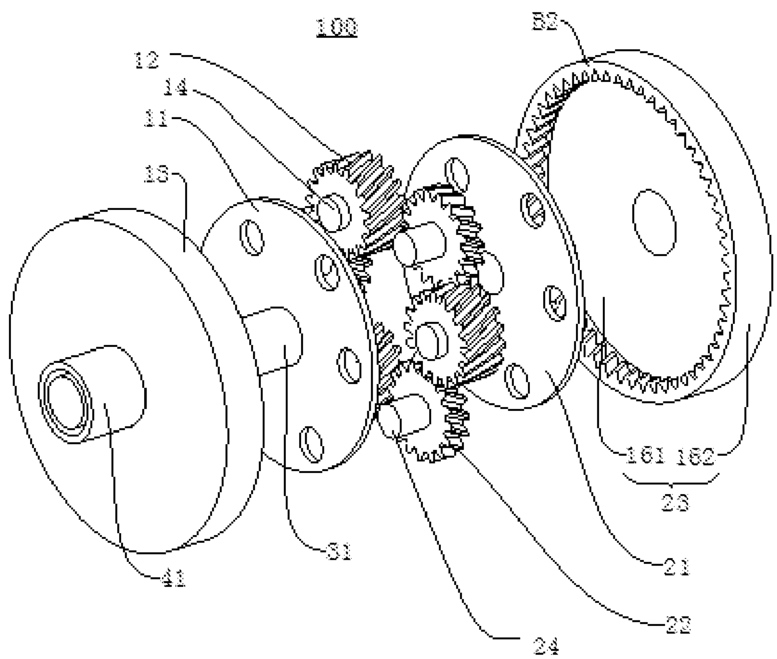
FIG. 1 is an exploded view of a differential according to an embodiment of the present disclosure from a perspective.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the description of the present disclosure, it should be understood that, location or position relationships indicated by the terms, such as "center", "longitude", "transverse", "length", "width", "thickness", "up", "down", "front", "rear", "left", "right", "vertical", "horizon", "top", "bottom", "inside", "outside", "clockwise", and "counterclockwise", are location or position relationships based on illustration of the accompanying drawings, are merely used for describing the present disclosure and simplifying the description instead of indicating or implying the indicated apparatuses or elements should have specified locations or be constructed and operated according to specified locations, and therefore, should not be intercepted as limitations to the present disclosure.

In addition, the terms such as "first" and "second" are used merely for the purpose of description, but shall not be construed as indicating or implying relative importance or implicitly indicating a number of the indicated technical feature. Hence, the feature defined with "first" and "second" may explicitly or implicitly include one or more of features. In the description of the present disclosure, unless otherwise explicitly specifically defined, "a plurality of" means at least two, for example, two or three.

In the present disclosure, unless otherwise explicitly specified or defined, the terms such as "mount", "connect", "connection", and "fix" should be interpreted in a broad sense. For example, a connection may be a fixed connection, or may be a detachable connection or an integral connection; a connection may be a mechanical connection, or may be an electrical connection; a connection may be a mechanical connection, or may be an electrical connection, or may be used for intercommunication; a connection may be a direct connection, or may be an indirect connection via an intermediate medium, or may be communication between interiors of two elements or an interaction relationship between two elements. It may be appreciated by those of ordinary skill in the art that the specific meanings of the aforementioned terms in the present disclosure can be understood depending on specific situations.

In the present disclosure, unless otherwise explicitly specified or defined, a first feature being "above" or "under" a second feature may include that the first and second features are in direct contact and may also include that the first and second features are not in direct contact but are in contact with another feature therebetween. In addition, the first feature being "over", "above" or "on the top of" a second feature may include that the first feature is over or above the second feature or merely indicates that the horizontal height of the firs feature is higher than that of the second feature. The first feature being "underneath", "below" or "on the bottom of" a second feature may include that the first feature is underneath or below the second feature or merely indicates that the horizontal height of the first feature is lower than that of the second feature.

A differential 100 according to an embodiment of the present disclosure is described in detail by referring to FIG. 1 to FIG. 14. The differential 100 may be used for an inter-wheel speed differential or an inter-shaft speed differential. Taking the inter-wheel speed differential as an example, the differential 100 can enable left and right driving wheels to roll at different angular velocities when a vehicle is traveling on an uneven road or a turning, so as to ensure only rolling movements between the driving wheels on two sides and the ground.

Figure 2:
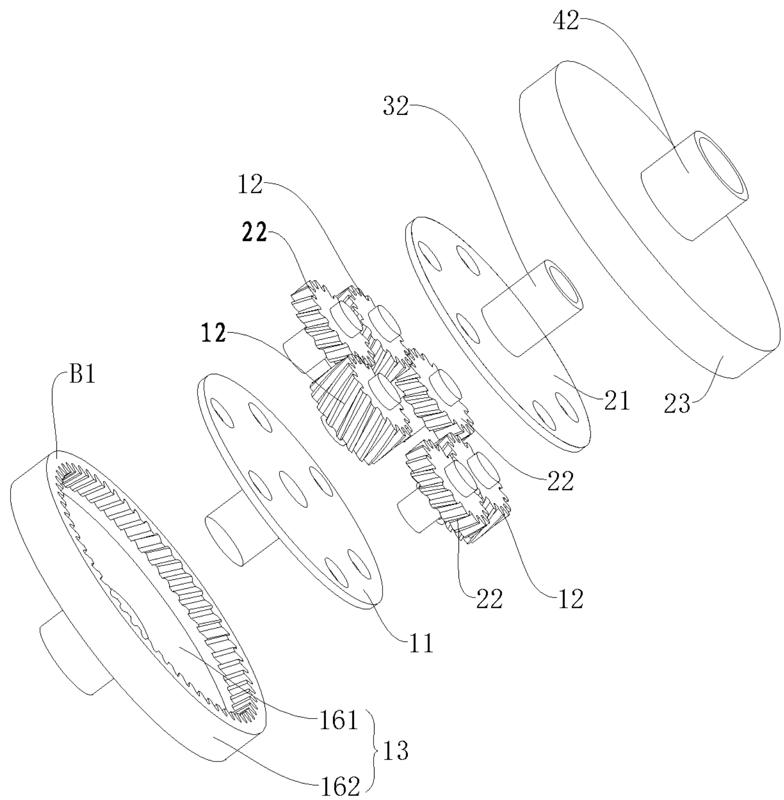
FIG. 2 is another exploded view of a differential according to an embodiment of the present disclosure from another perspective.

As shown in FIG. 1 and FIG. 2, the differential 100 according to some embodiments of the present disclosure may include a first planetary carrier 11, a first planetary gear 12, a first gear ring 13 as well as a second planetary carrier 21, a second planetary gear 22, and a second gear ring 23.

With references to embodiments of FIG. 1 and FIG. 2, both the first planetary carrier 11 and the second planetary carrier 21 may be configured as circular plate-shaped structures, so as to reduce an axial dimension of the differential 100 to some extent. In some embodiments, the first planetary carrier 11 and the second planetary carrier 21 may be configured as separated structures, i.e., the first planetary carrier 11 and the second planetary carrier 21 are separated from each other. Because it is relatively easy to mold an individual small component, separately and individually machining the first planetary carrier 11 and the second planetary carrier 21 can simplify a corresponding manufacturing process and improve machining precision thereof.

Figure 3:
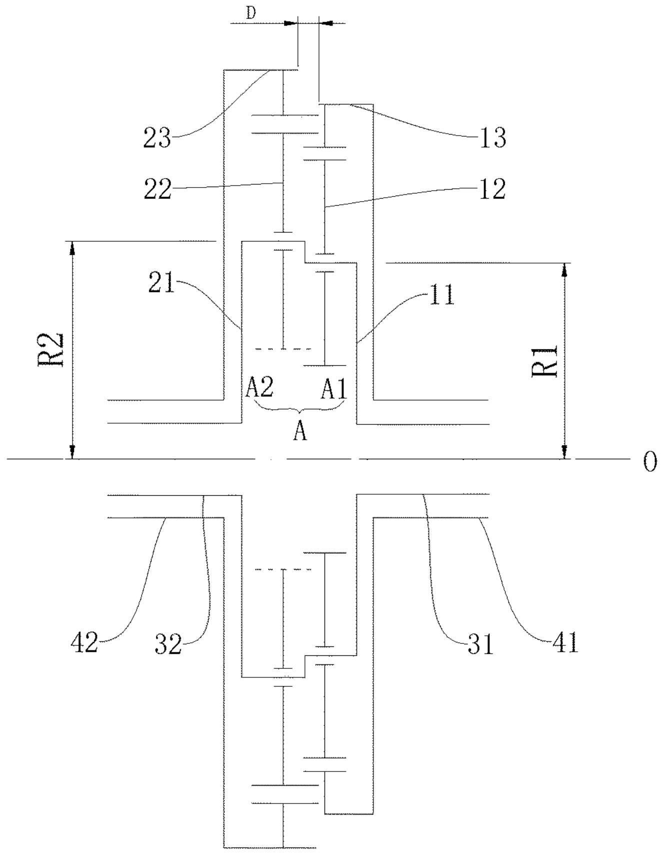
FIG. 3 is a planar schematic diagram showing a principle of a differential according to an embodiment of the present disclosure.
Figure 9:
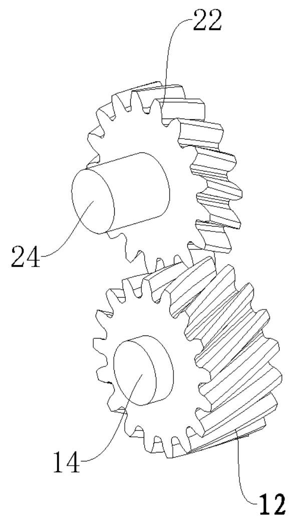
FIG. 9 is a perspective view of a first planetary gear and a second planetary gear according to an embodiment of the present disclosure.

As shown in FIG. 3 in combination with FIG. 1, FIG. 2, and FIG. 9, the first planetary gear 12 is disposed on the first planetary carrier 11. For example, each first planetary gear 12 is provided with a first planetary gear shaft 14 (as shown in FIG. 9), two ends of the first planetary gear shaft 14 may be rotatably carried on the first planetary carrier 11 and the second planetary carrier 21 respectively. In an embodiment, the two ends of the first planetary gear shaft 14 may be rotatably carried in shaft holes corresponding to each other in the first planetary carrier 11 and the second planetary carrier 21 with bearings, and the first planetary gear 12 may be fixed to the corresponding first planetary gear shaft 14. In some embodiments, the two ends of the first planetary gear shaft 14 may be fixedly connected to the first planetary carrier 11 and the second planetary carrier 21. For example, the two ends of the first planetary gear shaft 14 are respectively welded and fixed to the shaft holes corresponding to each other in the first planetary carrier 11 and the second planetary carrier 21, and the first planetary gear 12 is rotatably fitted over the corresponding first planetary gear shaft 14. For example, the first planetary gear 12 is rotatably fitted over the first planetary gear shaft 14 with a bearing. Hence, an objective of connecting the first planetary carrier 11 with the second planetary carrier 21 may be implemented by using the first planetary gear shaft 14, so as to enable the first planetary carrier 11 and the second planetary carrier 21 to move at a same speed and in a same direction (that is, a linkage between the first planetary carrier 11 and the second planetary carrier 21 is carried out). In addition, in this connection manner, the first planetary carrier 11 and the second planetary carrier 21 can favorably carry or fix the first planetary gear shaft 14, so as to prevent the differential 100 from failing due to a disconnection between the first planetary gear shaft 14 and an individual planetary carrier.

The first planetary gear 12 is meshed with the first gear ring 13, specifically in an internal meshing form, that is, the first planetary gear 12 is located at an inner side of the first gear ring 13 and is meshed with teeth on the first gear ring 13. In some embodiments, a plurality of first planetary gears 12 are provided, and distributed at the inner side of the first gear ring 13 at equal angle intervals along a circumferential direction. For example, in an embodiment, three first planetary gears 12 may be provided and an interval angle between any two adjacent first planetary gears 12 is 120°.

Similarly, as shown in FIG. 3 in combination with FIG. 1, FIG. 2, and FIG. 9, the second planetary gear 22 is disposed on the second planetary carrier 21. For example, each second planetary gear 22 is provided with a second planetary gear shaft 24 (as shown in FIG. 9), two ends of the second planetary gear shaft 24 may be rotatably carried in shaft holes corresponding to each other in the first planetary carrier 11 and the second planetary carrier 21 with bearings, and the second planetary gear 22 may be fixed to the corresponding second planetary gear shaft 24. Certainly, the two ends of the second planetary gear shaft 24 may also be fixedly connected to the first planetary carrier 11 and the second planetary carrier 21. For example, the two ends of the second planetary gear shaft 24 are respectively welded and fixed to the shaft holes corresponding to each other in the first planetary carrier 11 and the second planetary carrier 21, and the second planetary gear 22 is rotatably fitted over the corresponding second planetary gear shaft 24. For example, the second planetary gear 22 is rotatably fitted over the second planetary gear shaft 24 with a bearing. Hence, the objective of connecting the first planetary carrier 11 with the second planetary carrier 21 may be implemented by using the second planetary gear shaft 24, so as to enable the first planetary carrier 11 and the second planetary carrier 21 to move at a same speed and in a same direction. In addition, in this connection manner, the first planetary carrier 11 and the second planetary carrier 21 can favorably carry or fix the second planetary gear shaft 24, so as to prevent the differential 100 from failing due to a disconnection between the second planetary gear shaft 24 and an individual planetary carrier.

In addition, in some other embodiments of the present disclosure, in order to enable the first planetary carrier 11 and the second planetary carrier 21 to move at a same speed and in a same direction, the first planetary carrier 11 may also be directly and fixedly connected to the second planetary carrier 21 with an intermediate component. That is, movements of the first planetary carrier 11 and the second planetary carrier 21 at a same speed and in a same direction in the foregoing embodiment are implemented by using the first planetary gear shaft 14 and the second planetary gear shaft 24. However, in this embodiment, the movements of the first planetary carrier 11 and the second planetary carrier 21 at a same speed and in a same direction may be implemented directly by disposing the intermediate component. For example, the intermediate component may be located between the first planetary carrier 11 and the second planetary carrier 21, and be welded and fixed to the first planetary carrier 11 and the second planetary carrier 21 respectively.

The second planetary gear 22 is meshed with the second gear ring 23, specifically in an internal meshing form. That is, the second planetary gear 22 is located at an inner side of the second gear ring 23 and is meshed with teeth on the second gear ring 23. In some embodiments, a plutality of second planetary gears 22 are provided, and distributed at the inner side of the second gear ring 23 at equal angle intervals along a circumferential direction. For example, in an embodiment, three second planetary gears 22 may be provided and an interval angle between any two adjacent second planetary gears 22 is 120°.

It should be noted that FIG. 3 is a planar schematic diagram showing a principle of a differential 100 according to an embodiment of the present disclosure, in which a meshing relationship between the first planetary gear 12 and the second planetary gear 22 and meshing relationships between the first planetary gear 12 and the first gear ring 13 and between the second planetary gear 22 and the second gear ring 23 are illustratively shown. Because FIG. 3 is a planar diagram and shows the foregoing three meshing relationships at the same time, relative position relationships among components are merely illustrative and do not indicate or imply positions of the components in an actual spatial disposition.

Figure 8:
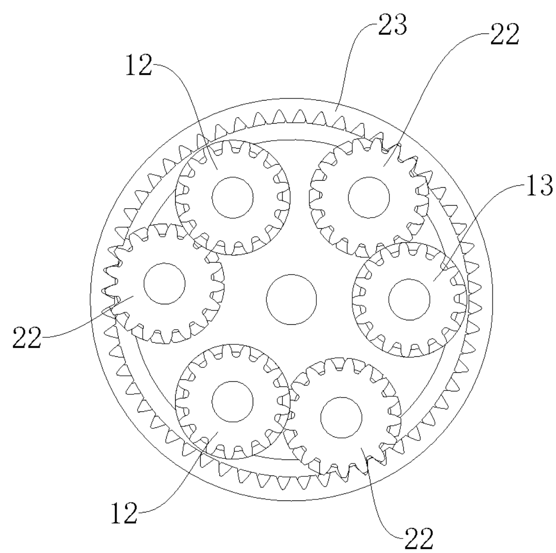
FIG. 8 is a partial schematic view of a differential according to an embodiment of the present disclosure.

In the embodiment in which the plurality of first planetary gears 12 and the plurality of second planetary gears 22 are provided, the plurality of first planetary gears 12 are correspondingly meshed with the plurality of second planetary gears 22 respectively. For example, as shown in FIG. 1, FIG. 2, and FIG. 8, three first planetary gears 12 and three second planetary gears 22 are provided, the first one of the three first planetary gears 12 may be meshed with the corresponding first one of the three second planetary gears 22, the second one of the three first planetary gears 12 may be meshed with the corresponding second one of the three second planetary gears 22, and the third one of the three first planetary gears 12 may be meshed with the corresponding third one of the three second planetary gears 22. In this way, multiple groups of the first planetary gear 12 and the second planetary gear 22 meshed with each other are provided. When the differential 100 transmits power, transmission of the power among the multiple groups of the first planetary gear 12 and the second planetary gear 22 meshed with each other is more stable and reliable.

In addition, in another embodiment in which the plurality of first planetary gears 12 and the plurality of second planetary gears 22 are provided, the plurality of first planetary gears 12 and the plurality of second planetary gears 22 are alternately disposed along the circumferential direction, and the first planetary gear 12 is meshed with the second planetary gear 22 adjacent thereto. That is, in this embodiment, the plurality of first planetary gears 12 and the plurality of second planetary gears 22 are alternately disposed along the circumferential direction to form a ring, each first planetary gear 12 is meshed with two second planetary gears 22 adjacent thereto, and similarly, each second planetary gear 22 is meshed with two first planetary gears 12 adjacent thereto.

With reference to the embodiment of FIG. 3, a revolution axis of the first planetary gear 12 conincides with a revolution axis of the second planetary gear 22, i.e., the first planetary gear 12 and the second planetary gear 22 have a same revolution axis O.

In an embodiment, as shown in FIG. 1 to FIG. 3 and FIG. 8 to FIG. 10, the first planetary gear 12 is meshed with and fitted with the second planetary gear 22. In other words, the first planetary gear 12 is meshed with the first gear ring 13 and also is meshed with the second planetary gear 22 at the same time, and the second planetary gear 22 is meshed with the second gear ring 23 and also is meshed with the first planetary gear 12 at the same time.

As shown in FIG. 3, the first gear ring 13 and the second gear ring 23 may be configured as two power output ends of the differential 100, and the first planetary carrier 11 and the second planetary carrier 21 correspondingly may be configured as two power input ends of the differential 100 (for example, at this time, the first planetary carrier 11 and the second planetary carrier 21 may be rigidly connected together). In this way, power output from an external power source may be input through the first planetary carrier 11 and the second planetary carrier 21, and may be further output through the first gear ring 13 and the second gear ring 23 after a speed differential action of the differential 100. In one implementation manner, the first planetary carrier 11 and the second planetary carrier 21 may be connected to a power source such as an engine or a motor, the first gear ring 13 and the second gear ring 23 may be connected to corresponding half shafts through gear transmission structures, and the half shafts are further connected to corresponding wheels. This implementation manner is shown as an example, and the scope of the present disclosure should not be limited to this implementation manner.

A working principle of the differential 100 is briefly described by taking the following example. The differential 100 is applied to the inter-wheel speed differential. The first gear ring 13 and the second gear ring 23 are configured as the power output ends of the differential 100, and the first planetary carrier 11 and the second planetary carrier 21 are configured as the power input ends of the differential 100. The first gear ring 13 may be connected to a left half shaft through, for example, a gear transmission structure, and the left half shaft may be connected to a left-side wheel. The second gear ring 23 may be connected to a right half shaft through, for example, a gear transmission structure, and the right half shaft may be connected to a right-side wheel. The power output by a power source, such as an engine and/or a motor, may be output to the first planetary carrier 11 and the second planetary carrier 21 after a deceleration action of a final drive. If the vehicle travels on an even road and does not turn, the left-side wheel and the right-side wheel theoretically have a same rotation speed. Then the differential 100 does not perform the speed differential action, such that the first planetary carrier 11 and the second planetary carrier 21 rotate at a same speed and in a same direction, and the first gear ring 13 and the second gear ring 23 rotate at a same speed and in a same direction, i.e., the first planetary gear 12 and the second planetary gear 22 only revolve and do not rotate. If the vehicle is traveling on an uneven road or is turning, the left-side wheel and the right-side wheel theoretically have different rotation speeds, and the first gear ring 13 and the second gear ring 23 also have different rotation speeds. That is, a rotation speed difference exists, and thus, at this time, the first planetary gear 12 and the second planetary gear 22 rotate while revolving. Rotations of the first planetary gear 12 and the second planetary gear 22 may accelerate one of the first gear ring 13 and the second gear ring 23 and decelerate the other one of the first gear ring 13 and the second gear ring 23. A rotation speed difference between the accelerated gear ring and the decelerated gear ring is a rotation speed difference between the left and right wheels, thereby implementing the speed differential action.

Hence, the differential 100 according to embodiments of the present disclosure utilizes a planetary differential principle, has a high space utilization ratio in terms of the structure and connection form, provides a small axial dimension, and also has plenty of advantages in production and assembly. Such a structural form can avoid dimension defects of an angle gear in axial and radial directions thereof, and also can additionally utilize a hollow space inside a driven gear of a final drive preferably, thereby achieving the high space utilization ratio, greatly facilitating the entire vehicle arrangement in which the differential 100 is assembled and meeting limitation requirements to the weight and size. Meanwhile, the differential 100 according to embodiments of the present disclosure has high reliability and preferable transmission efficiency, which is beneficial to reliability of a power transmission chain and smoothness of power output during turning, and thus is more practical with respect to a symmetrical angle gear differential.

In some embodiments, the first planetary gear 12 and the second planetary gear 22 have different revolution radiuses. That is, as shown in FIG. 3, a revolution radius of the first planetary gear 12 refers to a radius R1 by which the first planetary gear 12 revolves around the revolution axis O, and a revolution radius of the second planetary gear 22 refers to a radius R2 by which the second planetary gear 22 revolves around the revolution axis O. As shown in FIG. 3, R1≠R2, for example R2>R1. That is, revolution tracks of the first planetary gear 12 and the second planetary gear 22 are staggered from each other in a radial direction. In an example of the present disclosure, the revolution radius of the first planetary gear 12 is relatively small and the revolution radius of the second planetary gear 22 is relatively large.

Because the revolution radiuses of the first planetary gear 12 and the second planetary gear 22 are different, an inside diameter dimension of the first gear ring 13 is also different from an inside diameter dimension of the second gear ring 23 in some embodiments. A gear ring corresponding to a planetary gear (for example, the first planetary gear 12) having a relatively small revolution radius has a relatively small inside diameter dimension, that is, the planetary gear having the relatively small revolution radius is corresponding to a small gear ring (for example, the first gear ring 13) having a relatively small radius. A gear ring corresponding to a planetary gear (for example, the second planetary gear 22) having a relatively large revolution radius has a relatively large inside diameter dimension, that is, the planetary gear having the relatively large revolution radius is corresponding to a large gear ring (for example, the second gear ring 23) having a relatively large radius. In this way, the large gear ring (i.e., the second gear ring 23) and the small gear ring (i.e., the first gear ring 13) are staggered from each other in the radial direction, so as to prevent moving components, such as the gear rings and the planetary gears, from generating movement interference thereamong, thereby effectively reducing an axial gap between the first gear ring 13 and the second gear ring 23. For example, with reference to FIG. 3, FIG. 5, and FIG. 6, the axial gap is denoted by D, and by reducing the axial gap D, the axial dimension of the differential 100 is allowed to be smaller and the structure thereof is allowed to be more compact.

Structures of the first gear ring 13 and the second gear ring 23 are described in detail with reference to embodiments as follows.

Figure 5:
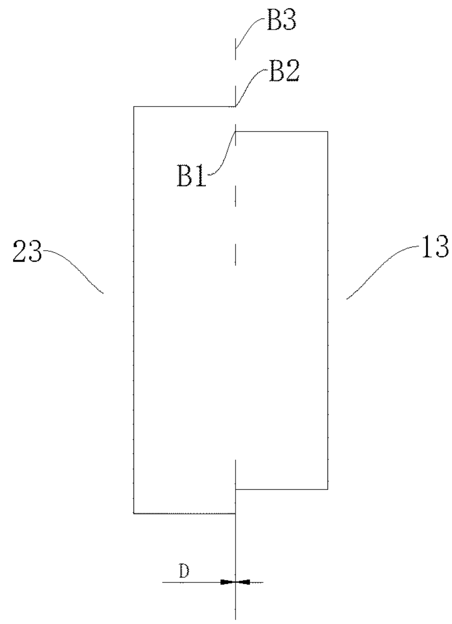
FIG. 5 is a schematic diagram showing positions of a first gear ring and a second gear ring in an embodiment of the present disclosure.

As shown in FIG. 5 in combination with FIG. 1 and FIG. 2, an end surface B1, facing the second gear ring 23, of the first gear ring 13 (referring to FIG. 2) and an end surface B2, facing the first gear ring 13, of the second gear ring 23 (referring to FIG. 1) are located in a same plane B3 (referring to FIG. 5). In other words, as shown in FIG. 5, the end surface B1 and the end surface B2 are located in the plane B3 at the same time, that is, the end surface B1 and the end surface B2 overlap the plane B3 respectively. Hence, the gap D between the first gear ring 13 and the second gear ring 23 in the axial direction is zero (as shown in FIG. 5). In this way, the axial dimension of the differential 100 may be greatly reduced, allowing a volume of the differential 100 to be smaller and the structure thereof to be more compact, and thus facilitating the arrangement of the entire power transmission system.

Figure 7:
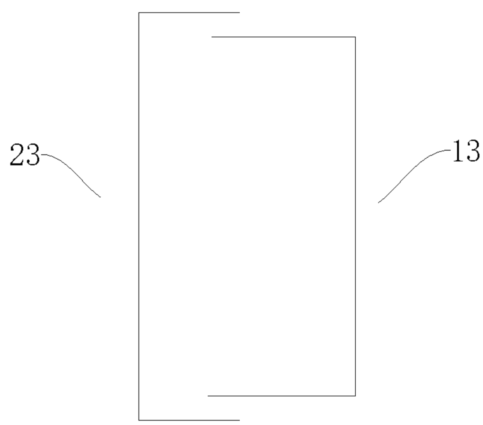
FIG. 7 is a schematic diagram showing positions of a first gear ring and a second gear ring in still another embodiment of the present disclosure.

In another embodiment, as shown in FIG. 7, one of the first gear ring 13 and the second gear ring 23, i.e., the small gear ring (for example the first gear ring 13), has a relatively small radius. The other gear ring, i.e., the large gear ring (for example the second gear ring 23), has a realtively large radius. The smaller gear ring is at least partially embedded into the large gear ring, and thus the gap D between the first gear ring 13 and the second gear ring 23 in the axial direction may be interpreted to be negative. Hence, the axial dimension of the differential 100 can also be reduced, and meanwhile, parts inside the two gear rings can be preferably protected by the first gear ring 13 and the second gear ring 23.

Figure 6:
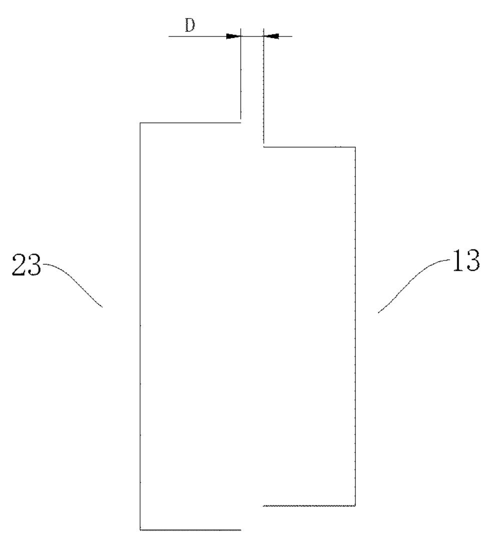
FIG. 6 is a schematic diagram showing positions of a first gear ring and a second gear ring in another embodiment of the present disclosure.

In some embodiments, as shown in FIG. 6, the first gear ring 13 and the second gear ring 23 may also be staggered from each other in the axial direction and spaced apart from each other by a certain distance D. It could be understood that merely in terms of reducing the axial dimension of the differential 100, the embodiment of FIG. 5 in which the gap D is zero and the embodiment of FIG. 7 in which the gap D is negative are more preferable than the embodiment of FIG. 6 (the gap D in the embodiment of FIG. 6 is positive).

It should be noted that in the embodiments of FIG. 1 to FIG. 3 and FIG. 5 to FIG. 7, both of the first gear ring 13 and the second gear ring 23 include a main flat plate portion 161 and an annular sidewall portion 162, and thus the foregoing gap D in FIG. 3 (in combination with FIG. 1, FIG. 2, and FIG. 5 to FIG. 7) refers to a distance between the annular sidewall portion 162 of the first gear ring 13 and the annular sidewall portion 162 of the second gear ring 23.

Figure 11:
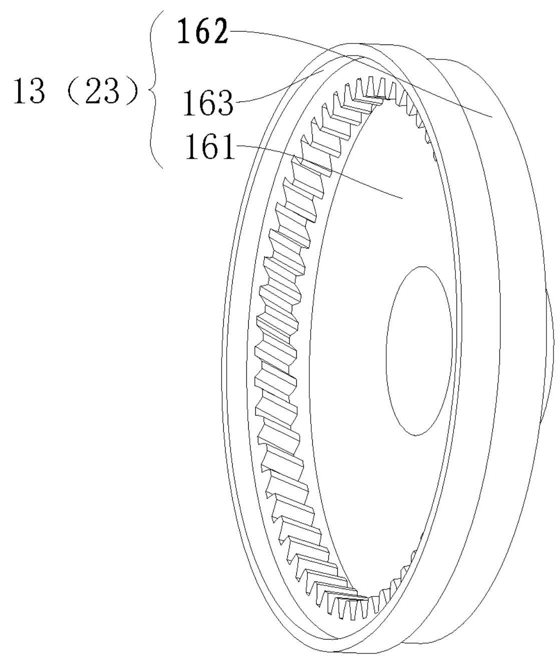
FIG. 11 is a perspective view of a first gear ring or a second gear ring according to an embodiment of the present disclosure.
Figure 12:
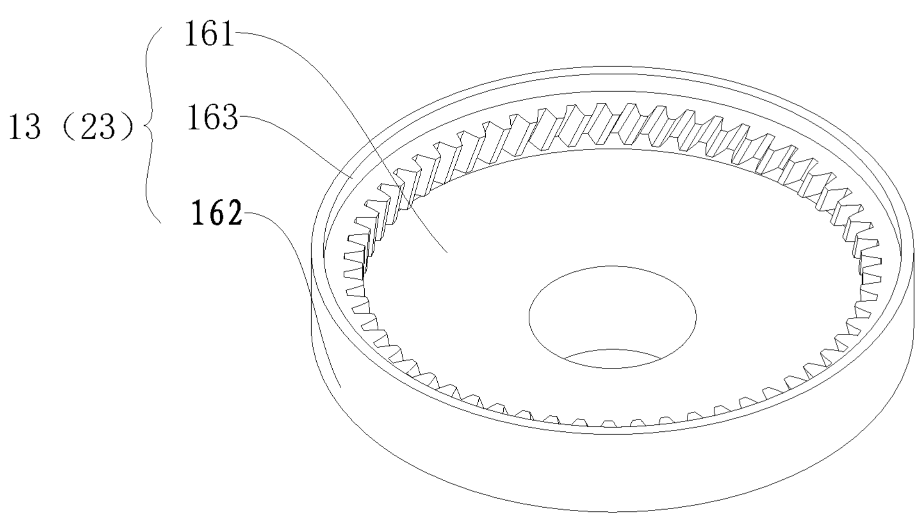
FIG. 12 is a perspective view of a first gear ring or a second gear ring according to another embodiment of the present disclosure.

Moreover, in some other embodiments of the present disclosure, for example, with reference to the embodiments of FIG. 11 and FIG. 12, each of the first gear ring 13 and the second gear ring 23 further includes an annular flange portion 163, and the annular flange portion 163 extends from an end surface of the annular sidewall portion 162 in a direction of departing from the main flat plate portion 161. In the embodiment of FIG. 11, an inner diameter of the annular flange portion 163 may be approximately equal to an outside diameter of the annular sidewall portion 162. The annular flange portion 163 looks as if the annular sidewall portion 162 protruding in a radial outwards direction (i.e., a peripheral surface of the first gear ring 13 or the second gear ring 23). Further, in the embodiment of FIG. 12, the outside diameter of the annular flange portion 163 may be approximately equal to the outside diameter of the annular sidewall portion 162, and the inside diameter of the annular flange portion 163 may be larger than the inside diameter of the annular sidewall portion 162. That is, a thickness of the annular flange portion 163 is smaller than a thickness of the annular sidewall portion 162.

However, it should be noted that in the gear ring structure in the embodiments of FIG. 1 to FIG. 3 and FIG. 5 to FIG. 7, the gap D between the two gear rings refers to a gap between the annular sidewall portions 162 of the two gear rings. Moreover, in the gear ring structure in the embodiments of FIG. 11 and FIG. 12, the gap D between the two gear rings refers to a gap between the annular flange portions 163 of the two gear rings.

Figure 4:
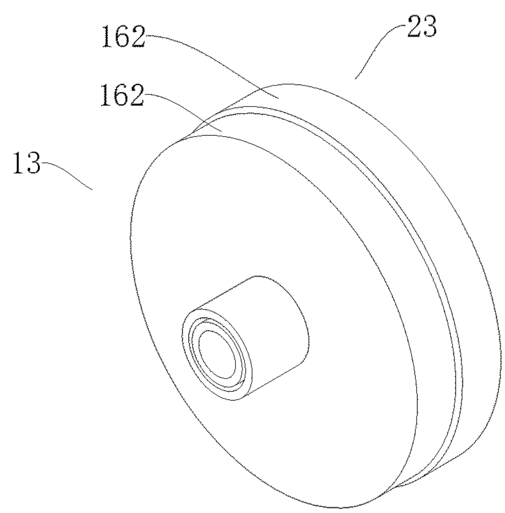
FIG. 4 is a perspective view of an assembled differential according to an embodiment of the present disclosure.

With respect to the embodiment in which the small gear ring is embedded into the large gear ring, as shown in FIG. 1 and FIG. 2 in combination with FIG. 3, each of the first gear ring 13 and the second gear ring 23 includes a main flat plate portion 161 and an annular sidewall portion 162 disposed at a peripheral edge of the main flat plate portion 161, and the main flat plate portion 161 and the annular sidewall portion 162 may be integrally molded components. Multiple gear teeth are disposed on an inner wall surface of the annular sidewall portion 162, in which, as shown in FIG. 4, an annular sidewall portion 162 of the small gear ring having the relatively small radius (namely, the first gear ring 13) is at least partially embedded into an annular sidewall portion 162 of the large gear ring having the relatively large radius (namely, the second gear ringe 23).

Certainly, with respect to the embodiment in which the small gear ring is embedded into the large gear ring, the gear structures in FIG. 11 and FIG. 12 may also be used. For example, the large gear ring may be configured as the gear ring structure in FIG. 11 or FIG. 12. That is, the large gear ring has an annular flange portion 163, the small gear ring may be configured as the common gear ring structure (without the annular flange portion 163) in FIG. 1 to FIG. 3. In this way, the annular sidewall portion 162 of the small gear ring may be at least partially embedded into the annular flange portion 163 of the large gear ring. Alternatively, both of the small gear ring and the large gear ring may be configured as the gear ring structure in FIG. 11 and FIG. 12, and in this way, the annular flange portion 163 of the small gear ring is at least partially embedded into the annular flange portion of the large gear ring. This embodiment is shown as an example, and the scope of the present disclosure should not be limited to this implementation manner.

In addition, it could be understood that although several embodiments in which the small gear ring is embedded into the large gear ring are provided above, they should not be construded to limit the protection scope of the present disclosure. After reading the foregoing content of the description, those skilled in the art may fully understand the embedding principle of the gear rings and make similar modifications to the foregoing small gear ring and/or large gear ring in terms of structure, which also fall within the protection scope of the present disclosure.

As shown in FIG. 3, a cavity A1 or A2 is defined between the main flat plate portion 161 and the annular sidewall portion 162 (referring to FIG. 3). In an embodiment, a cavity A1 is defined by the main flat plate portion 161 and the annular sidewall portion 162 of the first gear ring 13, a cavity A2 is defined between the main flat plate portion 161 and the annular sidewall portion 162 of the second gear ring 23, and the cavity A1 inside the first gear ring 13 and the cavity A2 inside the second gear ring 23 face each other to form a mounting space A (referring to FIG. 3), in which the first planetary carrier 11 and the first planetary gear 12 as well as the second planetary carrier 21 and the second planetary gear 22 are accommodated inside the mounting space A. In this way, the first gear ring 13 and the second gear ring 23 serve as external housings to protect the planetary carriers and the planetary gears accommodated therein, so as to prolong a service life thereof. In addition, with the cooperation of the implementation manner in which the end surface B1 of the first gear ring 13 is flushed with the end surface B2 of the second gear ring 23 or the implementation manner in which the small gear ring (for example, the first gear ring 13) having the relatively small dimension is at least partially embedded into the large gear ring (for example, the second gear ring 23) having the relatively large dimension, the mounting space A may be enabled to be relatively closed, and it is difficult for external impurities to enter the mounting space A to affect the moving components therein, thereby ensuring stable working of the differential 100.

The meshing relationship between the first planetary gear 12 and the second planetary gear 22 is described in detail with reference to the specific embodiments as follows.

Figure 10:
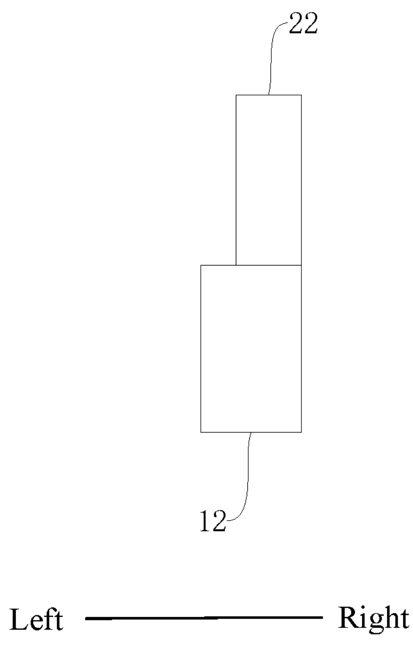
FIG. 10 is a brief diagram illustrating a meshing principle between a first planetary gear and a second planetary gear according to an embodiment of the present disclosure.

In the embodiment of the present disclosure, a thickness of the first planetary gear 12 is different from a thickness of the second planetary gear 22 in the axial direction (referring to FIG. 10), which helps reduce the axial dimension of the differential 100 to some extent. Further, gear teeth of a relatively thin planetary gear, for example the second planetary gear 22, are completely meshed with gear teeth of a relatively thick planetary gear, for example the first planetary gear 12. The gear teeth of the relatively thick planetary gear extend in the axial direction toward one side and beyond the gear teeth of the relatively thin planetary gear or the gear teeth of the relatively thick planetary gear respectively extend in the axial direction toward two sides and beyond the gear teeth of the relatively thin planetary gear. In the example of the present disclosure, the gear teeth of the relatively thick planetary gear merely extend in the axial direction toward one side and beyond the gear teeth of the relatively thin planetary gear. For example, as shown in FIG. 9 and FIG. 10, the relatively thick first planetary gear 12 extends toward the left side and beyond the relatively thin second planetary gear 22, and the right side surface of the relatively thick first planetary gear 12 is flushed with the right side surface of the relatively thin second planetary gear 22, thus facilitating the control over the axial dimension of the differential 100.

Because the first planetary gear 12 and the second planetary gear 22 have different revolution radiuses, with regard to the embodiment in which the planetary gears have different thicknesses, the revolution radius of the relatively thick planetary gear, for example the first planetary gear 12, is smaller than the revolution radius of the relatively thin planetary gear, for example the second planetary gear 22. In addition, the relatively thick planetary gear, for example the first planetary gear 12, corresponds to the small gear ring having a relatively small radial dimension, for example the first gear ring 13, and the relatively thin planetary gear, for example the second planetary gear 22, corresponds to the large gear ring having a relatively large axial dimension, for example the second gear ring 23, in which the outside diameter (an outer surface) of the large gear ring (i.e., the second gear ring 23) is greater than the outside diameter (an outer surface) of the small gear ring (i.e., the first gear ring 13). For example, in the example of the present disclosure, the thickness of the first planetary gear 12 is larger than the thickness of the second planetary gear 22, so that the first gear ring 13 corresponding to the relatively thick first planetary gear 12 is the small gear ring, the second gear ring 23 corresponding to the relatively thin second planetary gear 22 is the large gear ring, and the revolution radius of the first planetary gear 12 is smaller than the revolution radius of the second planetary gear 22.

In addition, it should be noted that the planetary gear having a relatively small revolution radius is meshed with the gear ring having a relatively small radius. In this case, the planetary gear having the relatively small revolution radius is the planetary gear having the relatively large thickness, a part of the planetary gear is meshed with internal teeth of the gear ring having the relatively small radius, and another part thereof is meshed with the planetary gear having a relatively large revolution radius, namely the relatively thin planetary gear.

In an embodiment, the inside diameter of the large gear ring (for example, the second gear ring 23) is larger than the outside diameter of the small gear ring (for example, the first gear ring 13). Herein, the inside diameter of the large gear ring refers to a radial dimension of an addendum circle of the internal teeth of the large gear ring. In other words, a diameter of the addendum circle of the internal teeth of the large gear ring is larger than the outside diameter of the small gear ring. In this way, the small gear ring may be entirely or at least partially embedded into the large gear ring, that is the foregoing axial gap D is reduced to a negative numeral (that is, the small gear ring is embedded into the large gear ring). Hence, the two gear rings and the two planetary gears would not have moving interference or friction thereamong, thereby improving stability of the differential 100, and meanwhile, also making the internal space relatively closed, so as to protect internal components such as the planetary carriers and the planetary gears.

The power output end and the power input end of the differential 100 are described in detail with reference to the specific embodiments as follows.

As shown in FIG. 1 to FIG. 3, the differential 100 further includes input shafts 31, 32 and output shafts 41, 42, the input shafts 31, 32 are respectively connected to the first planetary carrier 11 and the second planetary carrier 21. As shown in the example of FIG. 3, a right side of the first planetary carrier 11 is connected to the input shaft 31 and a left side of the second planetary carrier 21 is connected to the input shaft 32. The output shafts 41, 42 are respectively connected to the first gear ring 13 and the second gear ring 23. As shown in the example of FIG. 3, a right side of the first gear ring 13 is connected to the output shaft 41, and a left side of the second gear ring 23 is connected to the output shaft 42. The input shafts 31, 32, the output shafts 41, 42, the first gear ring 13 and the second gear ring 23 may be coaxially disposed.

Further, as shown in FIG. 3, the input shaft includes a first input shaft 31 and a second input shaft 32, the first input shaft 31 is connected to the first planetary carrier 11, and the second input shaft 32 is connected to the second planetary carrier 21; the output shaft may include a first output shaft 41 and a second output shaft 42, the first output shaft 41 is connected to the first gear ring 13, and the second output shaft 42 is connected to the second gear ring 23; the first input shaft 31 and the second input shaft 32 as well as the first output shaft 41 and the second output shaft 42 all may be of hollow shaft structures. In an embodiment, the first output shaft 41 is coaxially fitted over the first input shaft 31, and the second output shaft 42 is coaxially fitted over the second input shaft 32. Hence, the differential 100 has a more compact structure and a smaller volume.

According to some embodiments of the present disclosure, both the first planetary gear 12 and the second planetary gear 22 are cylindrical gears. As compared with the conventional symmetrical angle gear differential, the differential 100 using cylindrical gears has a more compact structure. Specifically, the differential 100 using cylindrical gears has a higher space utilization ratio in terms of the structure and connection form, provides a smaller axial dimension, and has more advantages in production and assembly.

Brief description is made on the specific structure of the differential 100 shown in the embodiments by referring to FIG. 1 to FIG. 3 as follows. As shown in FIG. 1 to FIG. 3, a purality of first planetary gear shafts 14 and a purality of second planetary gear shafts 24 are disposed between the first planetary carrier 11 and the second planetary carrier 21, a purality of first planetary gears 12 are provided and correspondingly connected to the first planetary gear shafts 14, and a purality of second planetary gears 22 are provided and correspondingly connected to the second planetary gear shafts 24. The thickness of the first planetary gear 12 is larger than the thickness of the second planetary gear 22, the gear teeth of the relatively thin second planetary gear 22 are completely meshed with the gear teeth of the relatively thick first planetary gear 12, and the gear teeth of the relatively thick first planetary gear 12 may extend toward the left side and beyond the relatively thin second planetary gear 22. The first gear ring 13 corresponding to the relatively thick first planetary gear 12 is the small gear ring, the second gear ring 23 corresponding to the relatively thin second planetary gear 22 is the large gear ring, and the end surface B1 of the small gear ring (i.e., the first gear ring 13) and the end surface B2 of the large gear ring (i.e., the second gear ring 23) may be located in a same plane, so that the axial gap D between the small gear ring and the large gear ring is zero, and the mounting cavity A inside the gear rings is relatively more closed.

Hence, the differential 100 according to the embodiments of the present disclosure utilizes a planetary gear in a cylindrical gear form, has a high space utilization ratio in terms of the structure and connection form, provides a small axial dimension, and has much advantages in production and assembly. The compact differential 100 further implements space and dimension avoidance of the planetary gear mechanisms at two sides by displacements of the planetary gear and the gear ring at one side (that is, the revolution radiuses of the planetary gears are different from each other). Such structural design greatly saves an axial gap for spatially avoiding the corresponding another group of planetary gear and gear ring, so that the compact differential 100 has a smaller axial dimension and is more compact.

In addition, in a case that the technical solutions and/or the technical features described in the foregoing embodiments are not in conflict with each other or in contradiction with each other, those skilled in the art can combine the technical solutions and/or the technical features in the foregoing embodiments with each other. The combined technical solution may be a superposition of two or more technical solutions, a superposition of two or more technical features, or a superposition of two or more technical solutions and technical features. Hence, the technical solutions and/or the technical features can interact with and support each other in terms of function, and the combined solution has better technical effects.

For example, those skilled in the art may combine the solution that an end surface, facing the second gear ring 23, of the first gear ring 13 and an end surface, facing the first gear ring 13, of the second gear ring 23 are located in a same plane with the solution of the structures of the first gear ring 13 and second gear ring 23. Hence, the axial gap between the two gear rings of the differential 100 is zero, so that the two gear rings can define a relatively closed mounting space to fully protect components inside the mounting space, thus prolonging service lifes thereof, reducing corresponding costs, and meanwhile, effectively reducing the axial dimension of the differential 100.

For another example, those skilled in the art can combine the solution that the thickness of the first planetary gear 12 is larger than the thickness of the second planetary gear 22 with the solution that the first gear ring 13 is a small gear ring and the second gear ring 23 is a large gear ring and the solution that the revolution radius of the first planetary gear 12 is smaller than the revolution radius of the second planetary gear 22. Hence, the combined solution of the differential 100 has a compact structure and a small volume, and can be conveniently disposed inside an engine compartment of the vehicle.

For still another example, those skilled in the art may combine the solution that an end surface, facing the second gear ring 23, of the first gear ring 13 and an end surface, facing the first gear ring 13, of the second gear ring 23 are located in a same plane with the solution of the meshing relationship between the relatively thick planetary gear and the relatively thin planetary gear. Hence, the axial gap between the two gear rings of the differential 100 is zero, so that the two gear rings can define a relatively closed mounting space to fully protect components inside the mounting space, thus prolonging service lifes thereof, and reducing corresponding costs. On another hand, the axial dimension of the differential 100 can also be further reduced, so that the differential 100 has a smaller volume.

Certainly, it should be understood that the foregoing examples are merely illustrative. With regard to the combination of the technical solutions and/or the technical features, those skilled in the art can make a free combination in case of no conflict, and the combined solution has better technical effects. The present disclosure merely briefly describes the forgoing multiple examples, and the examples are not listed exhaustively one by one herein.

In addition, it could be understood that the combined technical solution also falls within the protection scope of the present disclosure.

Generally, the differential 100 according to embodiments of the present disclosure can effectively save space and reduce weight. In an embodiment, as compared with the conventional angle gear differential, the planetary gear differential 100 can reduce the weight by approximately 30% and meanwhile, reduce the axial dimension by approximately 70%, so as to reduce the friction of the bearing, and also implement the torque distribution between the left and right wheels, so that the load distribution of the differential 100 is more proper and the rigidity of the differential 100 is better. In addition, because the cylindrical gear is used, the transmission efficiency is also improved. For example, the transmission efficiency of a conventional angle gear of 6-level precision or 7-level precision is approximately 0.97 to 0.98, and the transmission efficiency of the cylindrical gear of 6-level precision or 7-level precision is approximately 0.98 to 0.99. In addition, the use of the cylindrical gear also reduces working noise of the differential 100 and meanwhile reduces heat generation, thereby greatly prolonging the service life of the differential 100. Briefly, the differential 100 according to the embodiments of the present disclosure has many advantages such as a light weight, a small dimension, low costs, high transmission efficiency, low noise, less heat generation, and a long service life.

Meanwhile, a sun gear is omitted from the differential 100 according to theembodiments of the present disclosure, and omission of the sun gear has the following advantages.

In terms of mechanical analysis, the sun gear shall be omitted, and the speed differential shall be implemented by using a gear ring. Because as compared with the sun gear, the gear ring may be provided with more teeth, and meanwhile, has a larger pitch circle (the pitch circle refers to a pair of circles that are tangent to each other at a pitch point during the meshing transmission of gears), such that the load may be distributed more evenly and also the torque may be carried more evenly, which is beneficial to prolonging the service life of the differential 100. Meanwhile, in the absence of the sun gear, the differential 100 may be lubricated and cooled more favorably. That is, because the sun gear is omitted, a cavity may be formed inside the gear ring, the meshing between the gear ring and the planetary gear is an internal meshing (however, the meshing between the sun gear and the planetary gear is an external meshing), and thus lubricating oil may be stored inside the gear ring, so that the cooling and lubricating effects are greatly improved. In addition, because the sun gear is omitted, the number of parts is decreased, and the mass and cost of the differential 100 are reduced, so that the differential 100 is much smaller and lighter.

Figure 13:
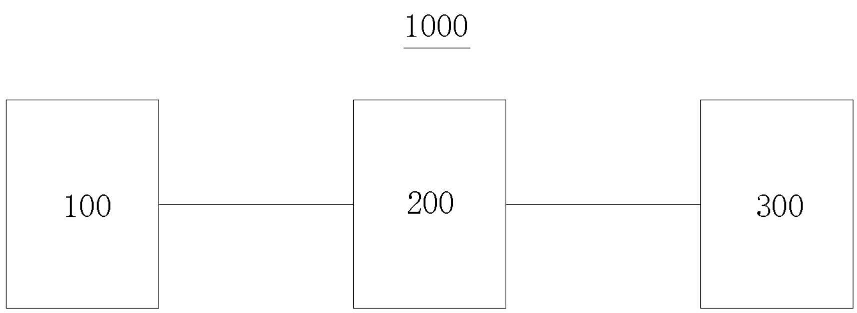
FIG. 13 is a schematic diagram of a power transmission system according to an embodiment of the present disclosure.

A power transmission system 100 according to embodiments of the present disclosure is briefly described as follows. The power transmission system 100 includes the differential 100 according to the foregoing embodiments of the present disclosure. As shown in FIG. 13, the power transmission system 1000 includes the differential 100, a transmission 200 and a power source 300. The power output from the power source 300 is output to the differential 100 after the speed changing action of the transmission 200 and then is distributed by the differential 100 to the driving wheels on two sides. It could be understood that the power transmission system 1000 shown in FIG. 13 is merely an example, instead of a limitation to the protection scope of the present disclosure. In addition, it should be understood that other configurations, such as the engine and the transmission, of the power transmission system according to the embodiment of the present disclosure all belong to the prior art and are well known to those skilled in the art, and therefore, are not described again herein one by one.

Figure 14:
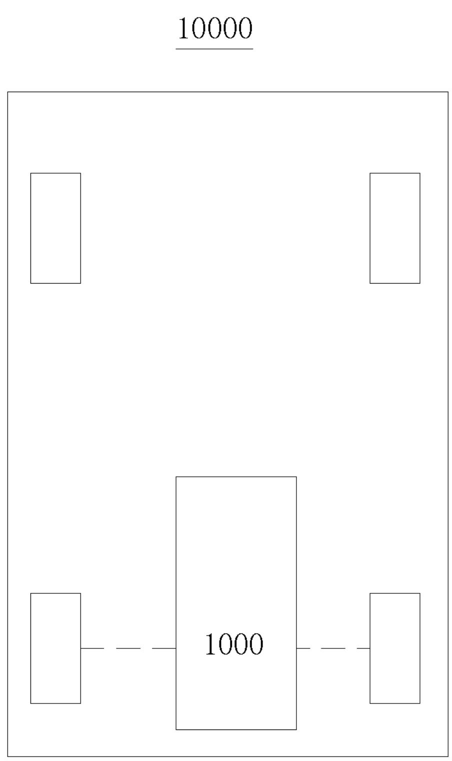
FIG. 14 is a schematic diagram of a vehicle according to an embodiment of the present disclosure.

As shown in FIG. 14, a vehicle 10000 according to an embodiment of the present disclosure is briefly described as follows. The vehicle 10000 includes the power transmission system 1000 according to the foregoing embodiment of the present dislcosure. The power transmission system 1000 may be used for a front wheel drive, and certainly, may also be used for a rear wheel drive, which is not specifically defined and limited by the present disclosure herein. It should be understood that other configurations, such as a braking system, a traveling system, and a steering system, of the vehicle according to the embodiment of the present disclosure all belong to the prior art and are well known to those skilled in the art, and therefore, are not described again herein one by one.

In the descriptions of this specification, a description of a reference term such as "an embodiment", "some embodiments", "exemplary embodiments", "examples", "specific examples", or "some examples" means that a specific feature, structure, material, or characteristic that is described with reference to the embodiment or the example is included in at least one embodiment or example of the present disclosure. In this specification, exemplary descriptions of the foregoing terms do not necessarily refer to a same embodiment or example. In addition, the described specific feature, structure, material, or characteristic may be combined in a proper manner in any one or more embodiments or examples. Moreover, those skilled in the art can joint and combine different embodiments or examples described in the present description.

Although the embodiments of the present disclosure have been shown and described, a person of ordinary skill in the art can understand that multiple changes, modifications, replacements, and variations may be made to these embodiments without departing from the principle and purpose of the present disclosure.

What is claimed is:

1. A differential, comprising:

a first planetary carrier;

a first gear ring;

a first planetary gear disposed on the first planetary carrier and meshed with the first gear ring;

a second planetary carrier;

a second gear ring; and a second planetary gear disposed on the second planetary carrier and meshed with the second gear ring as well as the first planetary gear, wherein the first gear ring and the second gear ring are configured as two power output ends of the differential, the first planetary carrier and the second planetary carrier are configured as power input ends of the differential, and a revolution radius of the first planetary gear is different from a revolution radius of the second planetary gear.

2. The differential according to claim 1, wherein a first end surface of the first gear ring faces the second gear ring, a second end surface of the second gear ring faces the first gear ring, and the first end surface and the second end surface are located in a same plane.

3. The differential according to claim 1, wherein one gear ring having a relatively small radius is at least partially embedded into the other gear ring having a relatively large radius; and one planetary gear having a relatively small revolution radius is meshed with the one gear ring having the relatively small radius, and the other planetary gear having a relatively large revolution radius is meshed with the other gear ring having the relatively large radius.

4. The differential according to claim 3, wherein each of the first gear ring and the second gear ring comprises:

a main flat plate portion; and an annular sidewall portion disposed at a peripheral edge of the main flat plate portion, wherein a plurality of teeth are disposed on an inner wall surface of the annular sidewall portion, and the annular sidewall portion of the one gear ring having the relatively small radius is at least partially embedded into the annular sidewall portion of the other gear ring having the relatively large radius.

5. The differential according to claim 2, wherein each of the first gear ring and the second gear ring comprises:

a main flat plate portion; and an annular sidewall portion disposed at a peripheral edge of the main flat plate portion, wherein a plurality of teeth are disposed on an inner wall surface of the annular sidewall portion, a cavity is defined between the main flat plate portion and the annular sidewall portion, and the cavity of the first gear ring and the cavity of the second gear ring face each other to form a mounting space.

6. The differential according to claim 5, wherein the first planetary carrier and the first planetary gear as well as the second planetary carrier and the second planetary gear are accommodated inside the mounting space.

7. The differential according to claim 1, wherein a thickness of the first planetary gear is different from a thickness of the second planetary gear in an axial direction.

8. The differential according to claim 7, wherein gear teeth of one planetary gear having a relatively small thickness are completely meshed with gear teeth of the other planetary gear having a relatively large thickness, and the gear teeth of the one planetary gear having the relatively large thickness extend in an axial direction toward one side and beyond the gear teeth of the other planetary gear having the relatively small thickness; or the gear teeth of the other planetary gear having the relatively large thickness respectively extend in an axial direction toward two sides and beyond the gear teeth of the one planetary gear having the relatively small thickness.

9. The differential according to claim 7, wherein a revolution radius of one planetary gear having a relatively large thickness is smaller than a revolution radius of the other planetary gear having a relatively small thickness.

10. The differential according to claim 7, wherein one planetary gear having a relatively large thickness is corresponding to one gear ring having a relatively small radius, and the other planetary gear having a relatively small thickness is corresponding to the other gear ring having a relatively large radius.

11. The differential according to claim 1, further comprising:

an input shaft connected to the first planetary carrier and the second planetary carrier respectively; and an output shaft connected to the first gear ring and the second gear ring respectively, wherein the input shaft and the output shaft are disposed coaxially.

12. The differential according to claim 11, wherein the input shaft comprises:

a first input shaft connected to the first planetary carrier; and a second input shaft connected to the second planetary carrier, wherein the output shaft comprises:

a first output shaft connected to the first gear ring and coaxially fitted over the first input shaft; and a second output shaft connected to the second gear ring and coaxially fitted over the second input shaft.

13. The differential according to claim 1, wherein both the first planetary carrier and the second planetary carrier are configured to have circular plate-shaped structures, and the first planetary carrier and the second planetary carrier are configured to have separated structures.

14. The differential according to claim 1, wherein a revolution axis of the first planetary gear conincides with a revolution axis of the second planetary gear.

15. The differential according to claim 1, wherein the first planetary gear and the second planetary gear both are configured as cylindrical gears.

16. The differential according to claim 1, wherein each first planetary gear is provided with a first planetary gear shaft, two ends of the first planetary gear shaft are connected to the first planetary carrier and the second planetary carrier respectively; and each second planetary gear is provided with a second planetary gear shaft, and two ends of the second planetary gear shaft are connected to the first planetary carrier and the second planetary carrier respectively.

17. The differential according to claim 1, wherein a plurality of first planetary gears are provided and distributed at first intervals along a circumferential direction, a plurality of second planetary gears are provided and distributed at second intervals along the circumferential direction, and the plurality of first planetary gears are correspondingly meshed with the plurality of second planetary gears respectively.

18. The differential according to claim 1, wherein a plurality of first planetary gears and a plurality of second planetary gears are provided, the plurality of first planetary gears and the plurality of second planetary gears are disposed alternately along a circumferential direction, and the first planetary gear is meshed with the second planetary gear adjacent thereto.

19. A power transmission system, comprising a differential according claim 1.

20. A vehicle, comprising a power transmission system according to claim 19.

* * * * *